(12) United States Patent
Harik

(10) Patent No.: US 10,467,530 B2
(45) Date of Patent: Nov. 5, 2019

(54) SEARCHING TEXT VIA FUNCTION LEARNING

(71) Applicant: Georges Harik, Palo Alto, CA (US)

(72) Inventor: Georges Harik, Palo Alto, CA (US)

( * ) Notice: Subject to any disclaimer, the term of this patent is extended or adjusted under 35 U.S.C. 154(b) by 292 days.

(21) Appl. No.: 14/073,576

(22) Filed: Nov. 6, 2013

(65) Prior Publication Data

US 2014/0129494 A1 May 8, 2014

Related U.S. Application Data

(60) Provisional application No. 61/724,160, filed on Nov. 8, 2012.

(51) Int. Cl.
*G06N 3/12* (2006.01)
*G06F 16/33* (2019.01)

(52) U.S. Cl.
CPC ........... *G06N 3/126* (2013.01); *G06F 16/334* (2019.01)

(58) Field of Classification Search
CPC .......................... G06N 3/126; G06F 17/30675
See application file for complete search history.

(56) References Cited

U.S. PATENT DOCUMENTS

| 5,581,657 | A | * | 12/1996 | Lyon | G06N 3/126 706/13 |
| 7,117,202 | B1 | * | 10/2006 | Willoughby | G06F 17/30864 |
| 8,291,319 | B2 | * | 10/2012 | Li | G06F 17/30864 704/9 |
| 2003/0069873 | A1 | * | 4/2003 | Fox | G06F 17/30696 |
| 2009/0037175 | A1 | * | 2/2009 | Wang | G10L 15/1822 704/251 |
| 2009/0138463 | A1 | * | 5/2009 | Chapelle | G06F 17/30867 |
| 2010/0060509 | A1 | * | 3/2010 | Chambers | G01S 7/411 342/22 |
| 2014/0058991 | A1 | | 2/2014 | Harik | |

* cited by examiner

*Primary Examiner* — Eric Nilsson
(74) *Attorney, Agent, or Firm* — Edward C. Kwok; VLP Law Group, LLP

(57) ABSTRACT

A method which does not rely on explicit inverted indices is provided to search for documents in a corpus of documents responsive to a textual search query. The method includes (a) selecting a program that is customized by setting values for a plurality of parameters, the program structured to receive the textual search query as input and to provide as output values indicating the relevance of the documents in the corpus to the search query; (b) training the program using a machine learning technique; and (c) applying the trained program to the textual search query. The program may be based on a structure that is developed based on a genetic programming technique.

9 Claims, 1 Drawing Sheet

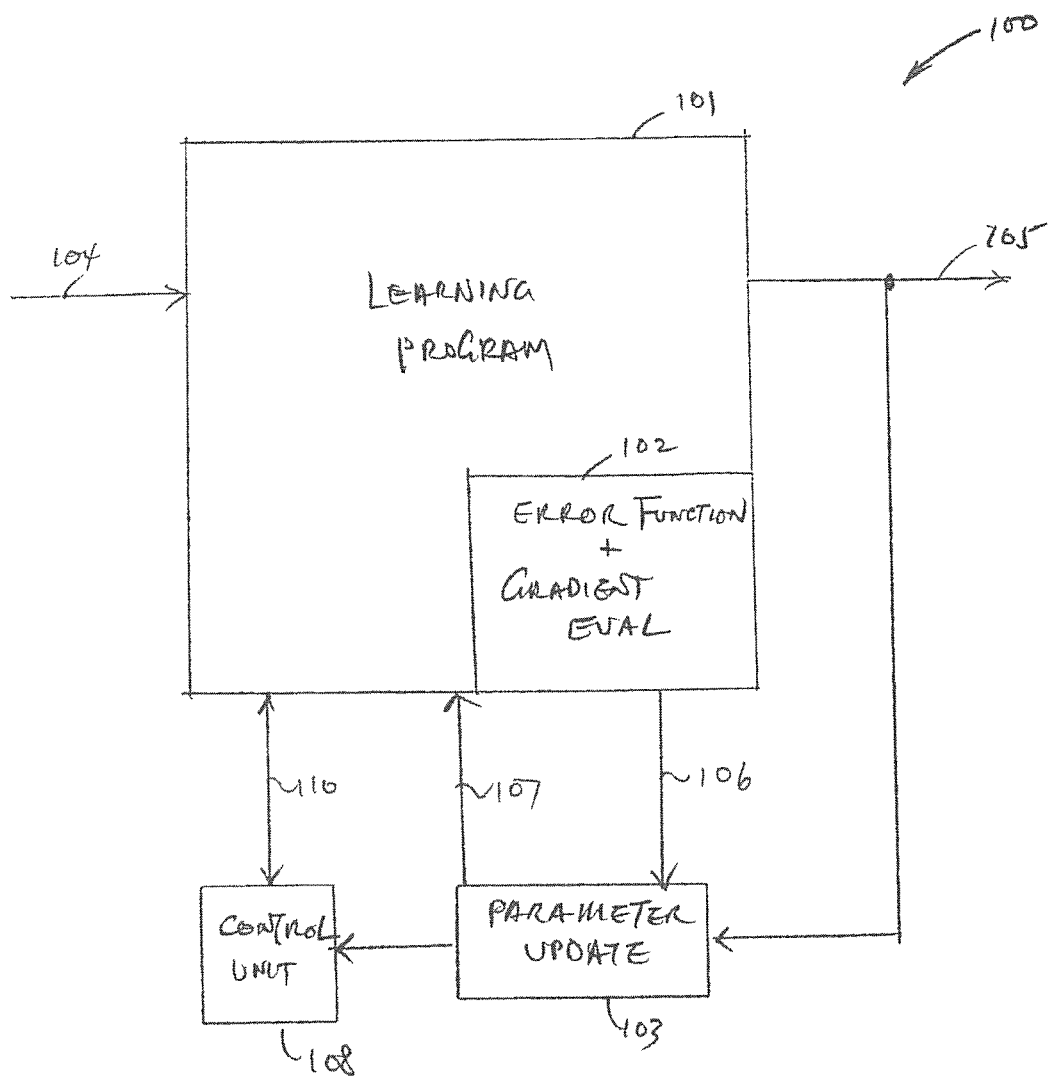

SEARCHING TEXT VIA FUNCTION LEARNING

CROSS REFERENCE TO RELATED APPLICATIONS

The present application is related to and claims priority of U.S. provisional patent application ("Provisional Patent Application"), Ser. No. 61/724,160, entitled "Searching Text via Function Learning," filed on Nov. 8, 2012. The disclosure of the Provisional Patent Application is hereby incorporated by reference in its entirety.

BACKGROUND OF THE INVENTION

1. Field of the Invention

The present invention relates to a method that searches for documents using a textual query. In particular, the present invention relates to methods for such searches that are not based on creating an explicit inverted index for search words.

2. Discussion of the Related Art

To allow a corpus of documents to be searched based on given words typically involves creating an inverted index which maps each word in a selected vocabulary to a list of documents containing that word. (An index maps a word to its occurrences in a document). Searching multiple words in the vocabulary then involves creating a union of the corresponding lists from the inverted index, and listing the resulting documents in decreasing order of relevance. Relevance may be determined based on a number of factors, such as the number of the words in the search query that are found in each document. The index itself is typically augmented, for each document, with information about each instance of the word in the document, such as the word's location, type and font used.

Creating an inverted index and performing a relevance computation based on literal occurrences of the words in the text can sometimes be brittle, and can often leads to results that do not reflect what the searcher intends to look for. For example, for the search query "new york auto show," if the search engine looks for documents that contain the words "new," "york," "auto," and "show," the search engine may home in on information about a new auto show in York, England, but may miss results that relate to a "car show in New York City." Such a result occurs because a strict literal interpretation of the textual query may overlook the similar meanings of the words "car" and "auto" in some context. Also, focusing only on occurrences of the words alone would miss the fact that the words "new york" in proximity becomes a term that has a different meaning than when these words appearing individually, being interspersed among other text. Thus, a method for searching for documents that is not based on conventional literal processing of the textual query is desired.

SUMMARY OF THE INVENTION

According to one embodiment of the present invention, a method allows searching for documents in a corpus of documents responsive to a textual search query. The method includes (a) selecting a program that is customized by setting values for a plurality of parameters, the program structured to receive the textual search query as input and to provide as output values indicating the relevance of the documents in the corpus to the search query; (b) training the program using a machine learning technique; and (c) applying the trained program to the textual search query. The program may be based on a structure that is developed based on a genetic programming technique.

To train such a program, a training method is included which repeats the steps of: (a) selecting a document from the corpus as a test document; (b) extracting one or more text sequences from the selected test document; (c) running the program using the extracted text sequences as search queries; (d) evaluating an error function that relates the output values of the program assigned to the test document with predetermined values assigned to the test document for the search queries ran; and (e) resetting the values of the parameters of the program based on the evaluated error function. Each predetermined value indicates the relevance of the test document to one of the search queries. In one embodiment, text corresponding to links in other documents that reference the test document are extracted and including in the search queries.

In one embodiment of the present invention, the output values of the program may include a probability distribution indicating the relevance of each document in the corpus to the search query. The machine learning technique for training the program may be based on applying a stochastic gradient descent technique.

The present invention is better understood upon consideration of the detailed description below in conjunction with the accompanying drawings.

BRIEF DESCRIPTION OF THE DRAWINGS

FIG. 1 is a block diagram of one implementation of optimizing predictive model 100 for learning the search function, according to one embodiment of the present invention.

DETAILED DESCRIPTION OF THE PREFERRED EMBODIMENTS

The present invention provides a method for searching a corpus of documents without using an explicit inverted index. Instead, using an appropriate machine learning technique, a function is learned or obtained which maps search terms to document identifiers directly. Unlike functions that are typically encountered in mathematics, which are usually concise, the learned function of the present invention is likely to be large. According to one embodiment of the present invention, the learned function accepts a textual query that includes a set of search terms and returns a relevance score for some or all of the documents from the corpus. A suitable relevance score may be, for example, a probability that a given document is the best response to the textual query among all documents in the corpus ("best document probability distribution"). For example, if the corpus is Wikipedia—an on-line encyclopedia containing millions of documents—the function should provide a high relevance score to the document at http://en.wikipedia.org/wiki/English_literature in response to the search query "english literature." The definition for the particular function cannot be concisely stated a priori because the function's definition must contain the data-dependent information relating the words and the documents in the corpus.

According to one embodiment of the present invention, such a function may be learned directly using a stochastic gradient descent technique over a computer program that is characterized by a large set of parameters which values can be adapted to learn many functions. A description of a method that illustrates the stochastic gradient descent technique may be found, for example, in U.S. patent application ("Co-pending Patent Application"), Ser. No. 14/010,436, entitled "METHOD FOR IMPROVING EFFICIENCY IN AN OPTIMIZING PREDICTIVE MODEL USING STOCHASTIC GRADIENT DESCENT," filed on Aug. 26, 2013; the disclosure of the Co-pending Patent Application is hereby incorporated by reference in its entirety to provide relevant information.

The stochastic gradient descent technique is based on minimizing an error function using one or more derivatives of the error function. In general, for a given corpus, the learned function is not unique; any of a number of eligible programs may emerge from the machine learning process. In one embodiment of the present invention, each program takes in a sequence of words as input and produces as output a best document probability distribution over document identifiers (i.e., each document is assigned a probability indicating the likelihood that it is the best document in the corpus in response to the supplied search query). To train a model to return such a probability presents its own difficulties, because it is time intensive to obtain training data correlating searches with the best possible result for a search. However, a proxy for the training data may be the combinations that use, for example, the title of the document, random word sequences extracted from a particular document and anchor texts extracted from links from other documents that refer to the document as search queries and which designate that document as the "best" results in the corpus in response to those search queries. Generally, the training data need not be self-consistent, i.e., it would not be harmful for the learning if the program is trained to return document A in one instance in response to a search query, and to return document B in another instance in response to the same search query, as it is often the case that both documents A and B are good results for that search query, and are better results than other documents in the corpus. The proxy training data provides an error function, which may be used to determine the gradient to be used in the stochastic gradient descent technique. This approach allows for generating reasonably good training examples for the stochastic gradient descent technique without otherwise creating a priori pairing of word sequences and appropriate documents.

Although many program structures may be appropriate for embodying the function to be trained, some program structures may be preferable to others. Some techniques for determining the structure of such a program may include, for example, genetic programming and similar techniques. In one technique, a part of a program that is determined to work well may be reused to construct other programs. The part that is to be reused may also include the values of the parameters of the program that are learned using the stochastic gradient descent technique. Using this technique, both the structure of the program, as well as the values of its parameters, may be learned to accomplish a particular task. Such a task may be, for example, obtaining a function that maps a sequence of words to a document that would be an appropriate search result using that sequence as a search query.

The learned function may be used to search documents in the corpus for documents in the entire corpus (i.e., including those documents not used as training data) based on a search query. In one embodiment, the learned function is used to search a large corpus, such as 10 million pages in the Wikipedia collection. In one implementation, because of a memory availability constraint, the corpus is divided in to multiple partitions and each partition is being searched separately using the search query, and a "best document" probability distribution is returned from each partition. As the probability distributions across partitions cannot be directly compared, an inverted index may be used to score the top documents returned by the learned function in each partition. The documents meeting a threshold score requirement in each partition are selected and combined with other similarly selected documents from other partitions. The learned function is then used to search the combined group of selected documents, resulting in a final "best document" probability distribution.

FIG. 1 is a block diagram of one implementation of optimizing predictive model 100 for learning the search function, according to one embodiment of the present invention. As shown in FIG. 1, optimizing predictive model 100 includes learning program 101, which implements the function to be learned. Learning program 101 receives input vector 104 from the training data and model parameter values 107 to provide output vector 105. Input vector 104 may include, for example, the textual search query. Output vector 105 is, for example, a "best document" probability distribution computed by learning program 101 based on model parameter values 107 over the documents in the training data. Integrated into learning program 101 is stochastic gradient descent module 102 which carries out evaluations of the loss or error function and the gradient vector 106 for the loss or error function with respect to model parameters values 107. Along with output vector 105, the gradient vector 106 is provided to parameter update module 103. Updated parameter values 107 are fed back into configuring learning program 101. Learning program 101 may be implemented in a computational environment that includes a number of parallel processors. In one implementation, each processor may be a graphics processor, to take advantage of computational structures optimized for arithmetic typical in such processors. Control unit 108 (e.g., a host computer system using conventional programming techniques) may configure the computational model for each program to be learned. Learning program 101 may be organized, for example, as a neural network model. The program model implemented in learning program 101 may be variable, taking into account, for example, the structure and values of the input vector and the structure and values of the expected output data. Control flow in the program model may be constructed based on the input vector or intermediate values ("states values") computed in the program model.

Computational models that are created using similar machine learning techniques find applications in, for example, predicting a possible next word or phrase in a text sequence, such as frequently encountered in a speech recognition application, for example. Another example is a document search application which identifies documents containing text segments from which a given text segment may likely have originated. This application is useful in searching text based on an approximate or incomplete query. The methods of the present invention may be used to build other search engines over text.

The above-detailed description is provided to illustrate specific embodiments of the present invention and is not intended to be limiting. Numerous variations and modifications within the scope of the present invention is possible. The present invention is set forth in the following claims.

I claim:

1. A method for searching documents in a corpus of documents based on a textual search query, the method comprising:

selecting a program that is characterized by a set of program parameters and which includes a search function and an error evaluation function that evaluates results from the search function, the selected program being structured to receive the textual search query as input and to provide, as output, values from the error evaluation function that indicate the relevance of each document in the corpus to the textual search query;

training the selected program using a machine learning technique based on training data from a subset of the corpus of documents, the machine learning technique comprises (i) applying (a) a structure determination technique that determines a learned structure for the selected program and (b) a program parameter values training technique that determines without user intervention learned values for the program parameters, wherein both the learned structure and the learned values are determined based on the error evaluation function; and (ii) embodying both the learned structure and the learned values into the selected program to provide a trained program; and executing the trained program using the textual search query as input.

2. The method of claim 1, wherein the program parameter values training technique includes a training method which comprises repeating the steps of:

selecting a document from the subset of the corpus as a test document;

extracting one or more text sequences from the selected test document;

running the selected program using the extracted text sequences as textual search queries;

for each textual search query, evaluating the error evaluation function to relate output values of the selected program with predetermined values assigned to the test document; and resetting the values of the program parameters based on results of the evaluated error evaluation function.

3. The method of claim 2, wherein each predetermined value represents a relevance score for the test document in response to one of the extracted text sequences as a textual search query.

4. The method of claim 2, wherein each extracted text sequence comprises one or more of: (i) a title of the test document, (ii) one or more sequences of words appearing in the test sequence, and (iii) anchor-text words in links to other documents in the subset of documents pointing to the test document.

5. The method of claim 2, wherein resetting the values of program parameters comprises an application of the stochastic gradient descent technique.

6. The method of claim 1, wherein the values from the error evaluation function comprise a probability distribution indicating the relevance of each document in the corpus to the textual search query.

7. The method of claim 1, wherein using the structure determination technique comprises an application of a genetic programming technique.

8. The method of claim 1, wherein executing the trained program comprises:

dividing the corpus of documents into a plurality of partitions;

executing the trained program on each of the partitions to obtain for each partition corresponding output values indicating the relevance of the documents in the partition to the textual search query; and combining the corresponding output values for the partitions to provide combined output values indicating the relevance of the documents in the corpus to the textual search query.

9. The method of claim 8, wherein combining the corresponding output values further comprises the step of, for each partition, scoring the documents associated with the corresponding output values using an inverted index, and combining the documents from the partitions according to the scores.

* * * * *